United States Patent [19]
Rocha

[11] Patent Number: 5,927,760
[45] Date of Patent: Jul. 27, 1999

[54] HOSE COUPLING PROTECTOR

[76] Inventor: Robert M. Rocha, 1817 Micheline, Corpus Christi, Tex. 78412

[21] Appl. No.: 08/951,606

[22] Filed: Oct. 16, 1997

[51] Int. Cl.⁶ ..................................................... F16L 55/00
[52] U.S. Cl. ........................... 285/45; 285/312; 138/96 R
[58] Field of Search ................................ 285/312, 45, 81, 285/87; 138/96 R

[56] References Cited

U.S. PATENT DOCUMENTS

| | | |
|---|---|---|
| 1,810,948 | 6/1931 | Dorn . |
| 1,934,681 | 11/1933 | Damsel . |
| 2,793,055 | 5/1957 | Meyerhoefer ................................ 285/7 |
| 3,352,574 | 11/1967 | Brian . |
| 3,744,528 | 7/1973 | Vestal . |
| 3,818,946 | 6/1974 | Bonnes . |
| 4,190,087 | 2/1980 | Herman ................................. 138/96 R |
| 4,222,593 | 9/1980 | Lauffenburger .......................... 285/312 |
| 4,269,232 | 5/1981 | Witschi . |
| 4,799,716 | 1/1989 | Kujawa . |
| 5,383,494 | 1/1995 | Caine . |

*Primary Examiner*—Eric K. Nicholson
*Attorney, Agent, or Firm*—G. Turner Moller

[57] ABSTRACT

A female hose coupling comprises a rigid sleeve for receiving a conduit stub on a liquid tank. The female hose coupling includes a smaller diameter conduit which slips inside a flexible hose. A pair of pivoted levers are mounted on the exterior of the rigid sleeve. A cam on each of the levers extends through an opening in the sleeve to engage a shoulder on the conduit stub. A protective sleeve surrounds the end of the female hose coupling and remains in place during normal use of the flexible hose. The protector provides a passage to accommodate the pivoted elvers and allow the coupling to operate in a normal fashion.

15 Claims, 1 Drawing Sheet

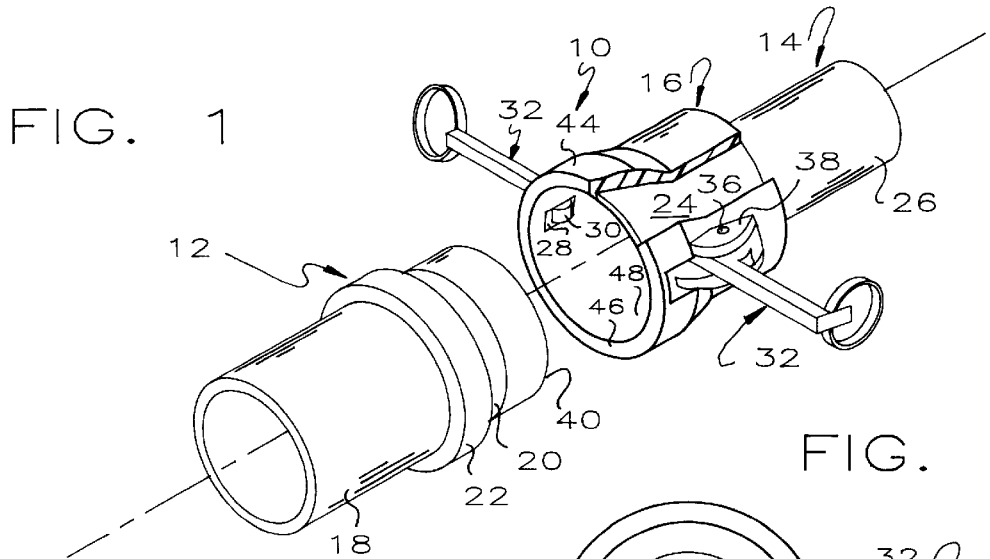
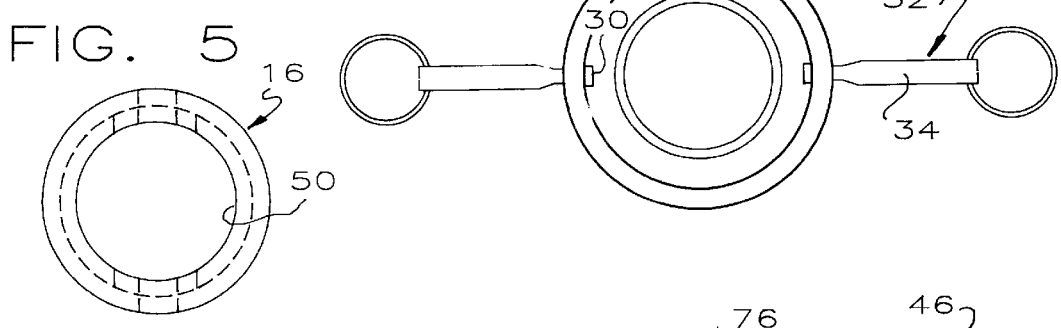
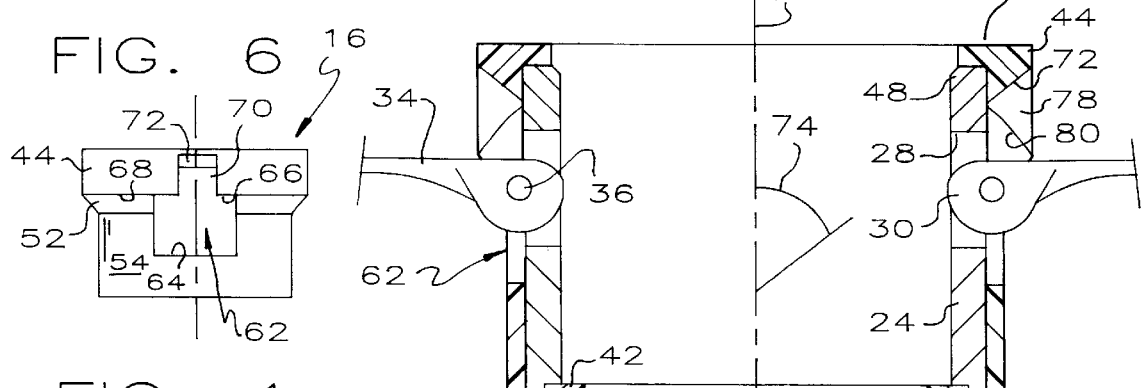
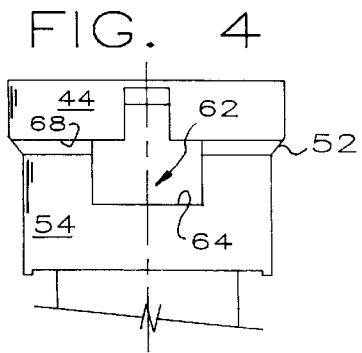

HOSE COUPLING PROTECTOR

This invention is a resilient protector for a coupling used on a hose end.

BACKGROUND OF THE INVENTION

Liquid tank trucks are widely used in a variety of situations to transport liquids. Gasoline delivery trucks, oil field vacuum trucks, septic tank service trucks, oil hauling trucks and the like comprise a large generally cylindrical tank into which the liquid is delivered and then emptied. Typically, these type trucks have a conduit stub extending horizontally from the tank. A hose assembly connects to the conduit stub and delivers the liquid to or from the tank. The hose assembly includes a central flexible hose having a male coupling on one end and a female coupling on the other end. The female coupling includes a rigid coupling end having a female connection receiving the conduit stub and a locking mechanism to secure the conduit stub in place. The locking mechanisms have evolved over the years but are now substantially standardized and include a pair of levers pivoted to the exterior of the rigid coupling end and a cam extending into the interior of the female coupling for engaging and latching into a circular recess on the conduit stub. Operation of the levers causes the cams to engage the recess and force the coupling halves toward each other. A seal in the female coupling engages the end face of the conduit stub and prevents leaking during liquid exchange.

The male connection on the hose assembly is normally substantially identical to the conduit stub so substantially identical hose assemblies may be attached, end to end, to provide a longer assembly.

Pipe end protectors are known in the prior art as shown in U.S. Pat. Nos. 1,810,948; 1,934,681; 3,352,574; 3,744,528; 3,818,946; 4,269,232; 4,799,716; and 5,383,494. Plastic or metal pipe end protectors are also well known in the oil field where the protector is threaded on each end of a pipe joint to protect the threads during transportation. Protection of threads on the male end is much more important because they are exposed. Pipe end protectors of this type are universally removed before the pipe is used in its normal and intended fashion.

SUMMARY OF THE INVENTION

A resilient coupling protector is provided on the end of the rigid coupling and includes a generally cylindrical body receiving the coupling end. The protector includes a pair of openings to receive and accommodate the latching levers and/or the connection between the latching levers and the rigid coupling end. The protector is sufficiently thick to provide substantial impact protection for the coupling end. Dropping a coupling equipped with a protector of this invention on a concrete floor from shoulder height does not damage the coupling end. Dropping a standard coupling end from a similar height will almost always cause the end to become egg-shaped and unusable.

The coupling protector is easily installed by removing the levers from the coupling, slipping the protector over the end of the coupling and then reinstalling the levers. A lip on the proximate end of the protector passes over a shoulder on the coupling and acts to retain the protector on the coupling end in a more-or-less permanent manner. The protector does not interfere with the levers so installation and removal of the coupling is accomplished in a standard fashion and the presence of the protector of this invention does not affect operation or use of the coupling in any manner.

It is an object of this invention to provide a more-or-less permanently installed protector for a rigid coupling used on the end of a flexible hose.

A further object of this invention is to provide a coupling end and/or hose having a female end which more-or-less permanently receives a resilient protector.

Another object of this invention is to provide a coupling end and/or hose having a resilient protector which is easily installed, which does not affect operation of the coupling and which substantially prevents damage to the coupling from impact.

These and other objects and advantages of this invention will become more apparent as this description proceeds, reference being made to the accompanying drawings and appended claims.

BRIEF DESCRIPTION OF THE DRAWINGS

FIG. 1 is an exploded broken isometric view of a coupling assembly, showing the female coupling equipped with an end protector of this invention;

FIG. 2 is an end view of the female coupling and end protector of FIG. 1;

FIG. 3 is a partial broken side elevational view of the female coupling and end protector of FIGS. 1 and 2, showing the lever handle extending to one side;

FIG. 4 is a partial broken side elevational view of the female coupling and end protector of FIGS. 1–3, showing the lever handle extending out of the page;

FIG. 5 is an end view of the end protector of FIGS. 1–3; and

FIG. 6 is a side elevational view of the end protector of FIGS. 1–5, viewed in the same direction as FIG. 4.

DETAILED DESCRIPTION

Referring to FIGS. 1–4, a coupling assembly 10 comprises, as major components, a male coupling or conduit stub 12, a female coupling 14 and an end protector 16 of this invention.

The conduit stub 12 is of conventional size, circular shape and includes an end 18 connected to a liquid tank (not shown) such as is typically found on a truck used to transport liquids. A typical liquid hauling truck is a gasoline truck used to haul gasoline to service stations, an oil field vacuum truck, an oil hauling truck, a septic tank service truck and the like. The conduit stub 12 includes a latching circular recess 20 and an upstanding rim or shoulder 22.

The female coupling 14 includes a rigid cylindrical sleeve 24 having an internal diameter sized to receive the end of the conduit stub 12 and a smaller conduit end 26, which typically has an outer diameter approximately the same size as the internal diameter of the sleeve 24, which extends into a flexible hose (not shown) having a male conduit stub (not shown) substantially identical to the stub 16 on the opposite end thereof. The sleeve 24 provides a pair of lateral openings 28 for receiving a cam end 30 of a lever assembly 32. The lever assembly 32 includes a handle 34 pivotally connected by a pin 36 to a pair of ears 38 on the exterior of the sleeve 24.

As will be apparent to those skilled in the art, rotation of the handles 34 toward the conduit stub 12 causes the cams 30 to withdraw from the interior of the sleeve 24 thereby unlatching the conduit stub 12 from the female coupling 14. With the conduit stub 12 in the rigid sleeve 24, rotation of the handles 34 toward the conduit end 26 causes the cams 30 to enter the inside of the sleeve 24, enter the circular recess 20 and pull the coupling halves 12, 14 together so the end face 40 of the conduit stub 12 engages and seals against a face seal 42 on the inside of the sleeve 24. The coupling stub 12 and the female coupling 14 will be recognized by those skilled in the art as being representative of tank truck couplings such as commercially available from American Packing Company, 6039 Armour Drive, Houston, Tex. and Max-Lok, Inc., 5937 Clinton Drive, Houston, Tex. to which reference is made for a more complete description.

The end protector 16 of this invention is made of a rubber or rubber-like material, such as buna-n-neoprene, urethane, VITON or the like, having a Durometer in the range of 40–100, and preferably about 70–90. Rubber materials harder than about Durometer 100 are generally unsuitable because they are so hard they do not cushion the sleeve 24 to any great extent. Rubber materials softer than about Durometer 40 are generally unsuitable because they are so soft they wear or abrade much too quickly and thus wear out much too quickly.

The end protector 16 includes a cylindrical rim 44, around the opening to the sleeve 24, which is considerably thicker than the remainder of the protector 16 because the main cause of severe damage to the female coupling is distortion of the open end of the sleeve 24 to an extent where the conduit stub 12 cannot enter the opening in the sleeve 24. In other words, if the open end of the sleeve 24 becomes egg-shaped, the female coupling is unusable and must be replaced. In such circumstances, the flexible hose is cut off near the end of the conduit end 26 and a new female coupling 14 installed. This is expensive, but the total cost of warping the opening to the sleeve 24 is much larger if the truck cannot be used until the hose is repaired.

A circular lip 46 extends from the rim 44 to overlie the edge 48 of the sleeve 24 and provides a central passage 50 to receive the conduit stub 12 without interference. A tapered section 52 of diminishing thickness merges with a cylindrical wall 54. A circular lip 56 on the end of the cylindrical wall 54 slips under a shoulder 60 of the female coupling, between the sleeve 24 and the conduit end 26.

A prominent feature on the sides of the protector 16 are sa pair of generally identical openings 62 through which extend the ears 38 and lever handles 34. Each of the openings 62 includes an enlarged lower end 64 which is generally rectilinear and is preferably rectangular. The upper edge 66 of the lower opening end 64 is on, or immediately adjacent, an edge 68 comprising the junction of the rim 44 and the tapered section 52. The lower opening end 64 is sufficiently wide to accommodate the ears 38 of the rigid sleeve 24. Thus, the lower opening end 64 extends downwardly along the cylindrical wall 54 a distance to just below the ears 38 and the lower opening end 64 is sufficiently wide to receive the ears 38.

The opening 62 also includes a notch 70 opening through the upper edge 66 of the opening 62. The notch 70 accommodates upward movement of the lever handles 34 so the lever assemblies 32 work in an unhindered fashion. The notch 70 accordingly includes a planar surface 72 inclined at an acute angle 74 to a centerline 76 of the female coupling 14. On opposite sides of the planar surface 72 are a pair of wedge shaped fingers 78 having an outer surface comprising an extension of the rim 44 and an inclined inner surface 80. The inclined surface 80 accommodates the upper end of the ears 38 and is closely adjacent thereto.

The protector 16 is installed on the female coupling 14 by removing the lever handles 34 by removing the pins 36 from the ears 38. The protector 16 slips easily over the open end of the rigid sleeve 24 so the lip 56 slips over the shoulder 60 between the enlarged rigid sleeve 24 and the conduit end 26. The circular lip 56 prevents movement of the protector 16 off the female coupling 14. Reinstalling the lever handles 34 makes the protector 16 very secure on the female coupling 14 so there is no danger of the protector 16 coming off.

A conventional stainless female coupling 14 equipped with the protector 16 of this invention can be dropped from an adult's shoulder height without damage. Dropping a similar stainless steel. coupling from this height inevitably egg shapes the open end of the coupling to an extent where it is unusable.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A female hose coupling comprising a rigid sleeve having a first end providing a central passage for receiving a coaxial male conduit stub, a second end of smaller external size than the first end, providing a shoulder between the first and second ends, for connection to a flexible hose, and means for sealing between the conduit stub and the rigid sleeve, the rigid sleeve having first and second lateral passages opening laterally into the central passage;

means for latching the conduit stub in the rigid sleeve and advancing the female hose coupling relative to the conduit stub for engaging the sealing means, the latching means including a pair of ears extending outwardly from an exterior of the rigid sleeve, a first lever having a first cam extending through the first passage, a second lever having a second cam extending through the second passage, and means pivoting the levers to the ears; and a coupling end protector comprising a resilient sleeve on the rigid sleeve extending from a first location beyond the first end of the rigid sleeve to a second location adjacent the shoulder, the resilient sleeve including a rim around the first end of the rigid sleeve extending from adjacent an opening to the central passage to a location between the central passage opening and the shoulder;

a generally cylindrical section of smaller outer size than the rim, thinner than the rim and having first and second lateral openings aligned with the first and second lateral passages, providing a lower opening section in the cylindrical section receiving at least a lower portion of the ears; and means on the resilient sleeve captivating the coupling end protector to the rigid sleeve, the ears and the levers extending through the first and second lateral openings.

2. The female hose coupling of claim 1 wherein the lip is generally circular and extends around the entire periphery of the central passage.

3. The female hose coupling of claim 2 wherein the coupling end protector includes a second lip overhanging the shoulder, the second lip providing part of the means captivating the coupling end protector to the rigid sleeve.

4. The female hose coupling of claim 1 wherein the first and second openings provide an upper notch opening into the lower opening section and wherein a junction between the upper notch opening and the lower opening section provides an inclined lower surface adjacent an upper end of the ears.

5. The female hose coupling of claim 4 wherein the upper notches provide an inclined surface defining an acute angle with a central axis of the central passage, the inclined surface comprising a stop limiting movement of the levers.

6. The female hose coupling of claim 1 wherein the coupling end protector comprises a tapered section having a first thick end adjoining the rim and a second thin end away from the rim and adjoining the cylindrical section.

7. The female hose coupling of claim 1 wherein the first and second openings provide an upper notch opening into the lower opening section and extending into the rib, the upper notch allowing for movement of the lever toward an unlatching position.

8. The female hose coupling of claim 1 wherein the coupling end protector comprises a lip adjacent to and overhanging the first end of the rigid sleeve, the lip providing a central opening allowing unobstructed access to the central passage of the rigid sleeve.

9. A coupling end protector for a female hose coupling of the type comprising a rigid sleeve having a first end providing a first central passage for receiving a coaxial male conduit stub, a second end for connection to a flexible hose, the second end being of smaller external size than the first end and providing a shoulder between the first and second ends, and means for sealing between the conduit stub and the rigid sleeve, the rigid sleeve having first and second lateral passages opening laterally into the first central passage and means for latching the conduit stub in the rigid sleeve and advancing the female hose coupling relative to the conduit stub for engaging the sealing means, the latching means including a pair of ears extending outwardly from an exterior of the rigid sleeve, a first lever having a first cam extending through the first passage, a second lever having a second cam extending through the second passage, and means pivoting the levers to the ears, the coupling end protector comprising a resilient sleeve for placement on the rigid sleeve extending from a first resilient sleeve end beyond the first end of the rigid sleeve to a second resilient sleeve end adjacent the shoulder, the resilient sleeve providing a second central passage therethrough for receiving the rigid sleeve and including a rim around the first resilient sleeve end extending from adjacent an opening to the second central passage to a location between the second central passage opening and the second resilient sleeve end, a generally cylindrical section of smaller outer size than the rim, thinner than the rim and having first and second lateral openings for alignment with the first and second lateral passages, providing a lower opening section in the cylindrical section for receiving at least a lower portion of the ears; and means on the resilient sleeve for captivating the coupling end protector to the rigid sleeve;

the first and second lateral openings being of sufficient size to receive the levers therein.

10. The coupling end protector of claim 9 further comprising a tapered section having a first thick end adjoining the rim and a second thin end away from the rim and adjoining the cylindrical section.

11. The coupling end protector of claim 9 wherein the first and second openings provide an upper notch opening into the lower opening section and wherein a junction between the upper notch opening and the lower opening section provides an inclined lower surface adjacent an upper end of the ears.

12. The coupling end protector of claim 11 wherein the upper notches provide an inclined surface defining an acute angle with a central axis of the central passage, the inclined surface comprising a stop limiting movement of the levers.

13. The coupling end protector of claim 9 further comprising a lip adjacent to and overhanging the first location, the lip providing a central opening allowing unobstructed access to the second central passage.

14. The coupling end protector of claim 13 further comprising a second lip overhanging the shoulder, the second lip providing part of the means captivating the coupling end protector to the rigid sleeve.

15. The coupling end protector of claim 9 wherein the first and second openings provide an upper notch opening into the lower opening section and extending into the rib, the upper notch allowing for movement of the lever toward an unlatching position.

* * * * *